United States Patent [19]
Takahashi et al.

[11] 3,966,674
[45] June 29, 1976

[54] EPOXY RESIN COMPOSITION

[75] Inventors: Masaaki Takahashi; Akira Ito, both of Tokyo; Yuriko Igarashi, Mitaka, all of Japan

[73] Assignee: Kureha Kagaku Kogyo Kabushiki Kaisha, Tokyo, Japan

[22] Filed: Oct. 1, 1974

[21] Appl. No.: 511,308

[30] Foreign Application Priority Data
Oct. 9, 1973  Japan.............................. 48-112885
Oct. 9, 1973  Japan.............................. 48-112886

[52] U.S. Cl...................... 260/45.7 R; 260/33.6 EP
[51] Int. Cl.²........................................... C08J 3/20
[58] Field of Search............. 428/418; 427/410, 64, 427/157, 158; 260/45.7 R; 252/301.3 R, 301.2 P

[56] References Cited
UNITED STATES PATENTS

| | | | |
|---|---|---|---|
| 2,765,288 | 10/1956 | Whittier et al. | 260/37 EP |
| 3,062,771 | 11/1962 | Boenau et al. | 260/33.6 EP |
| 3,344,114 | 9/1967 | Gibb et al. | 260/33.6 EP |
| 3,365,415 | 1/1968 | Kramer et al. | 260/33.6 EP |
| 3,386,920 | 6/1968 | Alburger | 252/301.2 P |

FOREIGN PATENTS OR APPLICATIONS
1,564,198  4/1969  France

OTHER PUBLICATIONS
Kirk–Othmer, Encyclopedia of Chemical Technology, vol. 19 (1967) pp. 654 to 682.
Paint, Oil and Chemical Review, Nov. 9, 1950, pp. 15 to 18 and 49.
Handbook of Chemistry and Physics–Chemical Rubber Pub. Co., pp. 996, 997, 1194 and 1195; 1959.

*Primary Examiner*—V. P. Hoke
*Attorney, Agent, or Firm*—Lane, Aitken, Dunner & Ziems

[57] ABSTRACT

An epoxy resin composition having excellent electric insulating properties is obtained by incorporating into an epoxy resin one or more additives selected from the group consisting of fluoranthene, pyrene, alkylfluoranthenes of the generic formula:

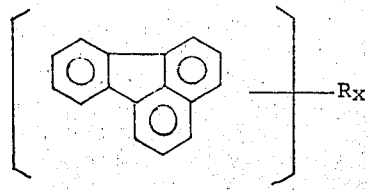

and alkylpyrenes of the generic formula:

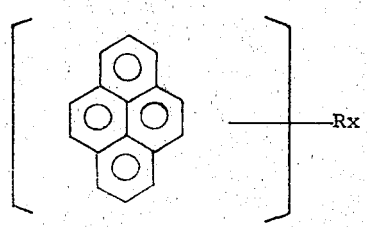

wherein, R denotes an alkyl group having from one to four carbon atoms and $x$ denotes an integer of from 1 to 4, and when $x$ has a value of 2 or more, R may be the same or different.

5 Claims, 4 Drawing Figures (a) (b) (c)

EPOXY RESIN COMPOSITION

FIELD OF THE INVENTION

This invention relates to a composition for use as an electrical insulating material and more particularly to an epoxy resin composition having excellent electrical insulating properties.

BACKGROUND OF THE INVENTION:

Epoxy resins have been widely used as solid electric insulating materials. As a consequence of an increased demand for electric power, however, a need for insulating materials suitable for use in high voltage applications has arisen. However, for use in such applications, epoxy resins be improved in durability against high electric potential.

SUMMARY OF THE INVENTION:

It is an object of this invention to provide an epoxy resin composition having excellent electrical insulating properties and, therefore, suitable for use in electric insulating materials capable of withstanding high voltages.

Other objects of this invention will become apparent from the further description given below. It has now been discovered that epoxy compositions containing one or more additives selected from the group consisting of fluoranthene, pyrene, specific alkylfluoranthenes and specific alkylpyrenes can be used quite satisfactorily as insulating materials capable of withstanding high electric potentials.

Thus, this invention provides a composition formed by incorporating into an epoxy resin one or more compounds selected from the group consisting of fluoranthene, pyrene, alkylfluoranthenes of the generic formula:

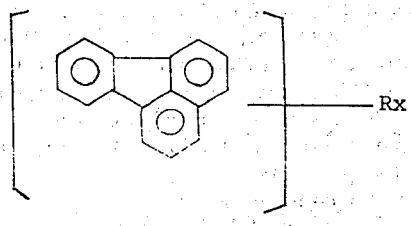

and alkylpyrenes of the generic formula:

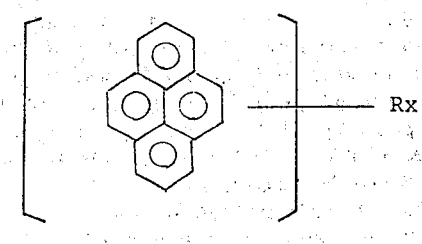

wherein, R is an alkyl group having from one to four carbon atoms and $x$ is an integer of from 1 to 4, and when $x$ is 2 or more, R may be same or different.

Figure 1:
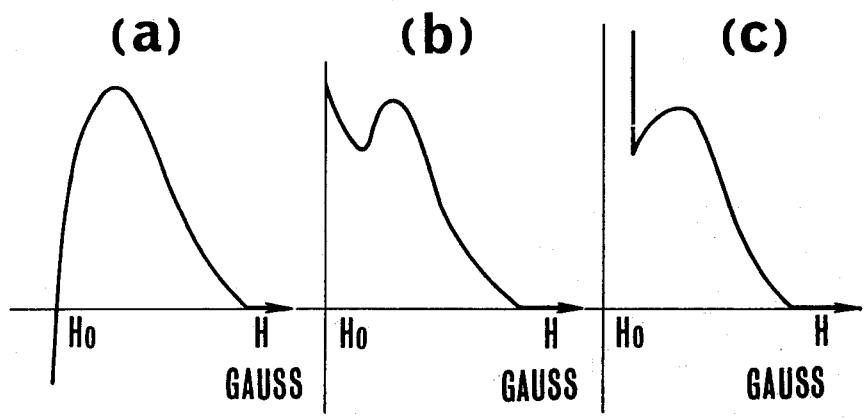
FIG. 1 shows the NMR (nuclear magnetic resonance) differential absorption curves, obtained by the broad line method, for epoxy resin compositions produced according to this invention by incorporating propylfluoranthene and propylpyrene into an epoxy resin to ascertain the compatibility of the propylfluoranthene and propylpyrene component of the compositions with other components thereof.

DETAILED DESCRIPTION OF THE INVENTION:

The alkylfluoranthenes which are used in the present invention are those represented by the following generic formula:

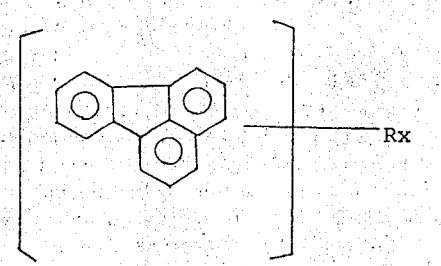

wherein, R denotes an alkyl group having from one to four carbon atoms and $x$ denotes an integer of from 1 to 4, and when $x$ is an integer of 2 or more, R may be same or different. From the structural formula, it is seen that these alkylfluoranthenes have at least one alkyl group selected from the goup consisting of methyl, ethyl, propyl and butyl attached at any position or positions in the fluoranthene nucleus. Such alkylfluoranthenes can easily be obtained by isolation from fractions such as coal tar and petroleum tar which are rich in polycyclic aromatic hydrocarbons or by alkylating fluoranthene with a lower olefin having up to four carbon atoms in the presence of a Friedel-Crafts type catalyst such as aluminum chloride or a solid acid catalyst such as silicaalumina. Alkylfluoranthene generally has many isomeric forms. For use in the present invention, a selected alkylfluoranthene need not necessarily be a single isomer but may be used in the form of a mixture of isomers.

The alkylpyrenes which are used in the present invention are those represented by the generic formula:

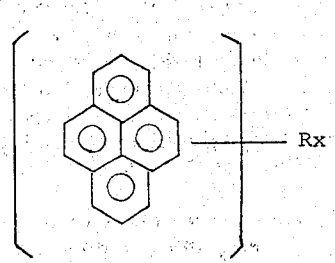

wherein, R denotes an alkyl group having from one to four carbon atoms and $x$ denotes an integer of from 1 to 4, and when $x$ is an integer of 2 or more, R may be same or different. The structural formula shows that these alkylpyrenes have at least one alkyl group selected from the group consisting of methyl, ethyl, propyl and butyl attached at any position or positions in the pyrene nucleus. Such alkylpyrenes can easily be obtained by isolation from fractions such as coal tar and petroleum tar which are rich in polycyclic aromatic hydrocarbons or by alkylating pyrene with a lower olefin having up to four carbon atoms in the presence of a Friedel-Crafts type catalyst such as aluminum chloride or a solid acid catalyst such as silica-alumina. Alkylpyrene generally has many isomeric forms. For the purpose of the present invention, however, a selected alkylpyrene need not always be a a single isomer but may be in the form of a mixture of isomers.

Alkylfluoranthenes having five or more alkyl groups containing respectively one to four carbon atoms attached to the fluoranthene nucleus, and alkylpyrenes having five or more alkyl groups containing respectively one to four carbon atoms attached to pyrene nucleus as well as alkylfluoranthenes having alkyl groups containing respectively five or more carbon atoms attached to fluoranthene nucleus and alkylpyrenes having alkyl groups containing respectively five or more carbon atoms attached to pyrene nucleus are difficult to synthesize. Where epoxy resin compositions are prepared with the addition of such alkylfluoranthenes and alkylpyrenes and used as electric insulating materials, these alkylfluoranthenes and alkylpyrenes show only a slight effect in improving the electrical properties, particularly resistence to treeing. Thus, the present invention requires alkylfluoranthenes and alkylpyrenes of the above generic formulas and limitations.

The weight percentage in which the additive is incorporated into the epoxy resin should preferably fall in the range of from 2 to 100 parts, preferably from 5 to 50 parts, by weight to 100 parts by weight of the epoxy resin. If the compound is incorporated in an amount less than the lower limit of 2 parts by weight, then the resultant composition provides an insufficient voltage stabilizing effect. If it is incorporated in an amount more than the higher limit of 100 parts by weight, the possibility is raised that the deflection temperature under load will be extremely lowered, that the thermal shock resistance will be lessened, that the intrinsic volume resistivity will be decreased, and so on.

The epoxy resins which are suitable for this invention include those of the glycidyl ether type, glycidyl ester type, glycidyl amine type, linear aliphatic epoxide type, alicyclic epoxide type, etc. The epoxy resin composition of the present invention may actually be applied as an electric insulating material by following conventional procedure. For example, the epoxy resin composition of this invention may be mixed with a hardener such as an amine, acid anhydride, polyamide resin, polysulfide resin, boron trifluoride, amine complex or a prepolymer. As occasion demands, it may further be mixed with hardening-accelerator, filler, diluent (such as, for example, dioctyl phthalate), flexibility-imparting agent, anticorrosiveness-imparting agent, reinforcing agent, etc.

When the epoxy resin composition is shaped as by cast molding or impregnation, it provides outstanding processability because of its low viscosity and consequent high fluidity which permit ready deaeration. The electric insulating materials produced from the epoxy resin compositions of this invention have high durability against thermal shock and at the same time excel in electric insulating properties, particularly in resistance to treeing.

The present invention will be described more specifically herein below with reference to the preferred embodiments. It should be understood that this invention is not limited to these examples.

EXAMPLE 1:

100 parts by weight of EPIKOTE 828 (Shell Chemical's trademark for bis-phenol A-glycidyl ether type epoxy resin) were mixed with 80 parts by weight of methyl nadic anhydride (hereinafter referred to briefly as "MNA") as a hardener and 2 parts by weight of tridimethyl aminomethyl phenol (available under the tradename of DMP-30 from Rohm and Haas Company) as a hardening-accelerator. This mixture was used as the basic formulation. This basic formulation was mixed with propyl fluoranthene and propyl pyrene in the different ratios shown in Table 1, thoroughly stirred and thereafter deaerated for about 1 hour in a vacuum dryer at 50°C. The epoxy resin blend thus formed was cast, while still hot, in a mold, prehardened at 80°C for 15 hours, then removed from the mold and subsequently hardened at 140°C for four hours to produce test specimens. The specimens obtained as described above were tested for intrinsic volume resistivity, deflection temperature under load and compatibility in accordance with the procedures (1), (2) and (3) described below. The results are given in Table 1.

For treeing characteristic voltage and durability against thermal shock, the aforementioned epoxy resin blends were tested in accordance with the procedures (4) and (5) described below. The results are also shown in Table 1.

It will be seen from Table 1 that epoxy resin compositions formed by incorporating from 5 to 50 parts by weight of propylfluoranthene into 100 parts by weight of epoxy resin and those formed by incorporating from 5 to 50 parts by weight of propylpyrene into 100 parts by weight of epoxy resin exhibit particularly outstanding electrical properties.

1. Intrinsic volume resistivity:

In accordance with JIS K-6911, a given specimen was subjected to application of a DC voltage of 67.5 KV through electrodes, of the TR-42 type and a vibration capacity type electrometer, Type TR-84MS, made by Takeda Riken K. K. in a constant-temperature constant-humidity room kept at 25°C. After 10 minutes under such conditions the value of resistivity was recorded. The electrodes had an effective area of 19.625 cm$^2$ and spaced by a distance of about 0.1 cm. Tin foil was attached in advance to the specimen to ensure better contact with the electrodes.

2. Deflection temperature under load:

A test piece measuring 110 mm in length, 3 mm in width and 12.8 mm in thickness was cut off each specimen, set in position on a deflection temperature tester and, with a load of 18.5 kgf/cm$^2$ applied thereto, heated at a temperature increase rate of 2°C/min. The heating was continued until the deflection of the test piece under load amounted to 0.25 mm. The temperature at which this deflection occurred was taken as deflection temperature under load.

3. Compatibility:

The specimens described above were each subjected to nuclear-magnetic resonance (NMR) by the broad line method to obtain NMR differential absorption curves given in FIG. 1. The compatibility of the propyl fluoranthene and propylpyrene with the other constituents in a given specimen was ascertained on the basis of the curves. In FIG. 1, $H_0$ denotes the resonant magnetic field of proton. In the drawing of FIG. 1, (a) is the NMR differential absorption curve in which the absorption of a narrow width peculiar to the oil (propyl fluoranthene or propyl pyrene) is not found, (b) the NMR differential absorption curve in which the absorption of a narrow width peculiar to the oil is slightly observed and (c) the NMR differential absorption curve in which the absorption of a narrow width peculiar to the oil occurs to more than 30%.

Of the specimens, those which were clear and which showed absorption behaviors equivalent to (a) are indicated by A, those which showed absorption behaviors equivalent to (b) and which, after standing for 30 days in a room kept at 25°C, did not show any bleeding of the oil component at the surfaces are indicated as B, and those which showed absorption behaviors equivalent to (c) and which, after standing for 30 days in a room kept at 25°C, showed bleeding of the oil component at their surfaces are indicated by X in Table 1.

The NMR measurement by the broad line method was conducted with, Model 30MC (JNM-W-30), made by Japan Electron Co. (Ltd.).

Figure 2:
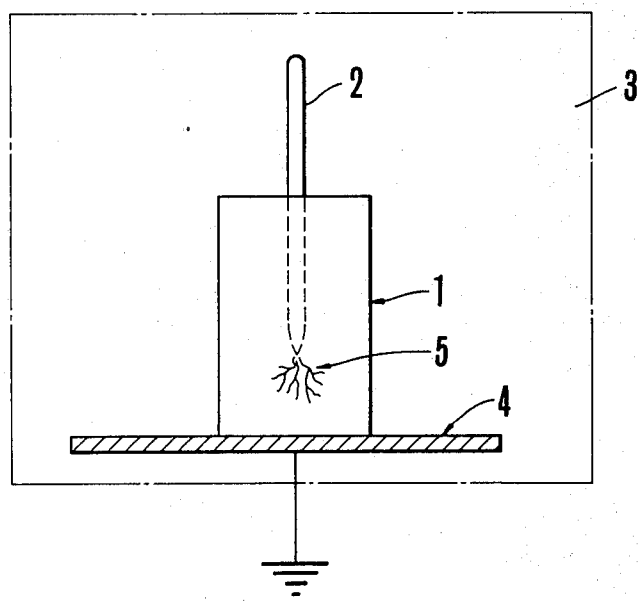
FIG. 2 is a schematic diagram showing the procedure for measuring the treeing characteristic voltage of a specimen prepared for measurement of treeing characteristic voltage.

4. Measurement of treeing characteristic voltage:

By "treeing" is meant a phenomenon in which the extremity of a specimen breaks up in the form of a tree as a an initial sign of dielectric breakdown. Generally, the measurement of treeing characteristic voltage is carried out for the purpose of ascertaining the durability of a given electric insulating material against treeing. The measurement of treeing characteristic voltage is generally accomplished by preparing a test piece 1 having a needle-shaped electrode 2 inserted therein as shown in FIG. 2, introducing it into a tank 3 containing a flat electrode 4 and filled with insulating oil, placing it in position on the flat electrode 4, spacing the flat electrode 4 and the needle-shaped electrode 2 by a predetermined electrode distance, applying a voltage therebetween by the direct grounding method and visually observing the portion of the test piece 1 surrounding the extremity of the needle-shaped electrode 2 until there occurs a tree-shaped fracture (treeing) as the voltage reaches a certain level. When the needle-shaped electrode 2 is inserted into the test piece 1, it suffices for this measurement that the needle-shaped electrode 2 be inserted into the test piece 1 until the tip of the needle-shaped electrode 2 advances to a depth at which the distance from the tip of the needleshaped electrode 2 to the bottom surface of the test piece 1 equals the prescribed electrode distance.

Figure 3:
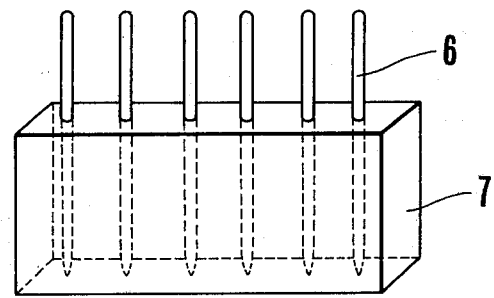
FIG. 3. is a schematic diagram of a specimen prepared for measurement of the treeing characteristic voltage.

For test purposes, a given epoxy resin blend was cast in a mold in which six needles had been set in position in advance, left to harden therein and thereafter allowed to stand at normal room temperature for five days to produce a test piece 7, as shown in FIG. 3, having six needleshaped electrodes 6 inserted therein and measuring 5 cm x 60 cm x 18 cm. The needle-shaped electrodes 6 were formed from No. 3 wires, which were polished and bent at the tip at an angle of 30° with a radius of curvature of less than 5 $\mu$.

Figure 4:
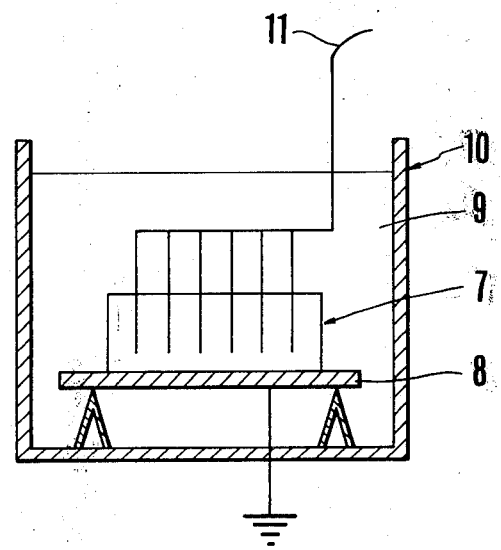
FIG. 4 is a diagram schematically showing the procedure by which electric potential is applied to the specimen of FIG. 2 for the measurement of the treeing characteristic voltage.

The test piece 7 having needle-shaped electrodes 6 inserted therein was, as shown in FIG. 4, introduced into a glass container 10 containing a flat electrode 8 and filled with silicone oil 9, and placed on top of the flat electrode 8. With the flat electrode 8 and the needle-shaped electrodes 6 spaced by an electrode distance of 2 cm, the test piece 7 was subjected for six hours to an initial of voltage of 1 KHz 4 KV applied through cable 11 by the direct grounding method, while watching the test piece for treeing. The test piece was maintained under these conditions for more than 15 hours. At the end of the initial 15 hour period, it was exposed for 6 hours to an increased voltage of 5 KV. Thereafter it was exposed for a fixed period of six hours to voltages successively increased by one KV until treeing at the tips of the needle-shaped electrodes 6 amounted to 50%. The voltage at which 50% of treeing occurred was taken as treeing characteristic voltage.

5. Durability against thermal shock:

In a container measuring 70 mm in diameter and 30 mm in depth, the aforementioned deaerated epoxy resin blend was placed, a brass ring washer 1 inch in diameter was imbedded in the blend and the blend was hardened by an ordinary method. The hardened specimen was soaked in boiling water for 30 minutes, then thrown in ice water and allowed to stand therein for 30 minutes. This boiling-cooling treatment was performed a total of five times. The specimens which showed no cracking were rated A, those which showed cracks after the first two cycles of treatment were rated X and those which did not show cracking until the last three cycles were rated B.

TABLE 1

| Specimen No. | Amount added (PHR) | Intrinsic volume resistivity ($\Omega$.cm), 25°C | Treeing characteristic voltage (KV) | Deflection temperature under load (°C) | Durability against thermal shock | Compatibility |
| --- | --- | --- | --- | --- | --- | --- |
| 1 | 0 | $6 \times 10^{16}$ | 6.0 | 138 | A | A |
| 2 | 5 | $6 \times 10^{16}$ | 9.0 | 132 | A | A |
| 3 | 10 | $7 \times 10^{16}$ | 10.0 | 126 | A | A |
| 4 | 20 | $8 \times 10^{16}$ | 13.0 | 115 | A | A |
| 5 | 30 | $5 \times 10^{16}$ | 14.5 | 107 | A | A |
| 6 | 50 | $4 \times 10^{16}$ | 15.5 | 94 | A | A |
| 7 | 70 | $3 \times 10^{16}$ | 15.0 | 84 | B | A |
| 8 | 100 | $8 \times 10^{15}$ | 14.0 | 73 | B | B |
| 9 | 120 | $7 \times 10^{14}$ | 15.0 | 68 | X | X |
| 10 | 0 | $6 \times 10^{16}$ | 6.0 | 138 | A | A |
| 11 | 5 | $7 \times 10^{16}$ | 9.0 | 133 | A | A |
| 12 | 10 | $8 \times 10^{16}$ | 11.0 | 128 | A | A |
| 13 | 20 | $6.5 \times 10^{16}$ | 13.0 | 117 | A | A |
| 14 | 30 | $5 \times 10^{16}$ | 14.0 | 108 | A | A |
| 15 | 50 | $3 \times 10^{16}$ | 15.0 | 95 | A | A |
| 16 | 70 | $1.8 \times 10^{16}$ | 15.0 | 86 | B | A |
| 17 | 100 | $8 \times 10^{15}$ | 14.5 | 75 | B | B |

TABLE 1-continued

| Specimen No. | Amount added (PHR) | Intrinsic volume resistivity ($\Omega$.cm), 25°C | Treeing characteristic voltage (KV) | Deflection temperature under load (°C) | Durability against thermal shock | Compatibility |
| --- | --- | --- | --- | --- | --- | --- |
| 18 | 120 | $7 \times 10^{14}$ | 15.0 | 69 | X | X |

(Note)
In the preceding table, the specimens, No. 1 to 9, inclusive contained propylpyrene and specimens, No. 10 to 18, inclusive contained propylfluoranthene.

EXAMPLE 2:

100 parts by weight of EPIKOTE (Shell Chemical's trademark for bis-phenol A-glycidyl ether type epoxy resin, were mixed with 80 parts by weight of MNA as a hardener and 2 parts by weight of DMP-30 as a hardening accelerator. The resultant mixture was used as the basic formulation. This basic formulation was mixed with 20 parts by weight of fluoranthene, pyrene, an alkylfluoranthene, an alkylpyrene or a mixture of two or more of such compounds, stirred thoroughly and then deaerated for about one hour in a vacuum dryer at 50°C. The epoxy resin blend thus produced was cast, while still hot, in a mold, pre-hardened at 80°C for 15 hours, thereafter removed from the mold and further hardened at 140°C for four hours to produce a test specimen. The test specimens thus prepared were tested in the same manner as described in Example 1. The results are shown in Table 2.

It is seen from Table 2 that the epoxy resin compositions of the present invention have improved resistance to treeing compared with the composition solely containing the basic formulation and the composition containing SUNDEX 8125 (aromatic solvent for rubber, made by Sun Oil Company and a known agent for improving polyethylene with respect to electrical insulating properties) and the basic formulation.

TABLE 2

| Name of substance | Boiling point (°C) | Amount added (PMR) | Intrinsic volume resistivity ($\Omega$.cm) 25°C | Treeing characteristic voltage (KV) | Durability against thermal shock | Compatibility |
| --- | --- | --- | --- | --- | --- | --- |
| (Additive according to this invention | | | | | | |
| Pyrene | 393 | 20 | $2 \times 10^{16}$ | 14.0 | A | A |
| Methylpyrene | 390 – 410 | 20 | $5 \times 10^{16}$ | 13.0 | A | A |
| Ethyl pyrene | 400 – 420 | 20 | $4 \times 10^{16}$ | 13.0 | A | A |
| Propylpyrene | 410 – 430 | 20 | $3 \times 10^{16}$ | 12.5 | A | A |
| Butyl pyrene | 420 – 460 | 20 | $3 \times 10^{16}$ | 10.0 | A | A |
| Mixture I (*1) | 390 – 520 | 20 | $4 \times 10^{16}$ | 12.0 | A | A |
| Mixture II (*2) | 400 – 500 | 20 | $4 \times 10^{16}$ | 12.5 | A | A |
| Fluoranthene | 382 | 20 | $3 \times 10^{16}$ | 13.5 | A | A |
| Methyl-fluoranthene | 380 – 440 | 20 | $7 \times 10^{16}$ | 14.0 | A | A |
| Ethyl-fluoranthene | 390 – 410 | 20 | $6 \times 10^{16}$ | 13.0 | A | A |
| Propyl-fluoranthene | 400 – 420 | 20 | $8 \times 10^{16}$ | 13.0 | A | A |
| Butyl-fluoranthene | 410 – 450 | 20 | $5 \times 10^{16}$ | 11.0 | A | A |
| Mixture III (*3) | 385 – 510 | 20 | $6 \times 10^{16}$ | 12.5 | A | A |
| Mixture IV (*4) | 400 – 495 | 20 | $6 \times 10^{16}$ | 13.0 | A | A |
| Mixture V (*5) | 410 – 450 | 20 | $3 \times 10^{16}$ | 12.0 | A | A |
| (Comparative examples) | | | | | | |
| No addition | — | 0 | $6 \times 10^{16}$ | 6.0 | A | — |
| SUNDEX 8125 | — | 20 | $5 \times 10^{16}$ | 6.0 | A | A |

(Note)

**(*1) Mixture I**
- Pyrene — 5 wt%
- Monopropyl pyrene — 50 wt%
- Dipropyl pyrene — 30 wt%
- Tripropyl pyrene — 10 wt%
- Tetrapropyl pyrene — 5 wt%

**(*2) Mixture II**
- Propyl pyrene — 50 wt%
- Ethyl pyrene — 50 wt%

**(*3) Mixture III**
- Fluoranthene — 5 wt%
- Monopropyl fluoranthene — 50 wt%
- Dipropyl fluoranthene — 30 wt%
- Tripropyl fluoranthene — 10 wt%
- Tetrapropyl fluoranthene — 5 wt%

**(*4) Mixture IV**
- Propyl fluoranthene — 50 wt%
- Ethyl fluoranthene — 50 wt%

**(*5) Mixture V**
- Propyl fluoranthene — 50 wt%
- Propyl pyrene — 50 wt%

EXAMPLE 3:

100 parts by weight of CHISSONOX 221 (Chisso K. K's trademark, CX-221, for an alicyclic epoxy resin were mixed with 70 parts by weight of MNA as a hardener and 1.0 part by weight of benzylmethyl amine (hereinafter referred to briefly as "BDMA") as a hardening-accelerator. The resultant mixture was used as the basic formulation. This basic formulation was mixed, respectively, with 20 parts by weight of propyl pyrene and propyl fluoranthene, stirred thoroughly, deaerated at 50°C for about 1.5 hours, then cast in a mold, pre-hardened at 80°C for 5 hours, thereafter removed from the mold and hardened at 140°C for 15 hours. As shown in Table 3, the compositions thus produced had notably improved resistance to treeing compared with the composition solely containing the basic formulation. The results are shown in Table 3.

EXAMPLE 5:

100 parts by weight of EPIKOTE 828 as an epoxy resin were mixed with 80 parts by weight of MNA, 2 parts by weight of DMP-30 as a hardening-accelerator and 100 parts by weight of silica powder as a filler. The reultant mixture was used as the basic formulation. Portions of the basic formulation were mixed respectively, with 20 parts by weight of propyl pyrene and propyl fluoranthene as an additive, stirred at normal room temperature in a mixer for about 30 minutes, then cast in a mold, deaerated at 80°C for 1 hour under vacuum and, with the pressure returned to normal atmospheric pressure, pre-hardened in situ for 15 hours, then removed from the mold and thereafter hardened at 140°C for four hours. It was found that silica powder could be mixed simultaneously with the other ingredients but that a more homogeneous mixture was obtained by first mixing silica powder thoroughly with the additive of the invention and then adding the other ingredients. The compositions incorporating an additive of the invention were found to have notably improved resistance to treeing as compared with the composition not containing an additive. The results are shown in Table 5.

TABLE 3

| | Composition (part by weight) | | | | Characteristic values | |
|---|---|---|---|---|---|---|
| No. | Expoxy resin (CX221) | Hardener (MNA) | Hardening-accelerator (BDMA) | Additive according to this invention | Intrinsic volume resistivity (Ω.cm) 25°C | Treeing characteristic voltage (KV) |
| 1 | 100 | 70 | 1.0 | No addition | 5 × 10$^{16}$ | 6.0 |
| 2 | 100 | 70 | 1.0 | Propyl pyrene (20) | 4 × 10$^{16}$ | 12.5 |
| 3 | 100 | 70 | 1.0 | Propyl fluoranthene (20) | 4 × 10$^{16}$ | 12.0 |

EXAMPLE 4:

60 parts by weight of CHISSONOX 221 (CX221), an alicyclic epoxy resin, were mixed with 40 parts by weight of ARALDITE CT200 (Chiba-Geigy's trademark for bis-phenol A-glycidyl ether type epoxy resin), 100 parts by weight of hexahydrophthalic anhydride (hereinafter referred to briefly as "HHPA") as a hardener and 1.0 parts by weight of BDMA as a hardeningaccelerator. Portions of the resultant mixture were respectively mixed with 20 parts by weight of propyl pyrene and propyl fluoranthene, thoroughly stirred, deaerated at 50°C for one hour under vacuum, then cast in a mold, pre-hardened at 80°C for 10 hours, thereafter removed from the mold, and hardened at 150°C for 15 hours. As shown in Table 4, the compositions thus produced showed notably improved resistance to treeing as compared with the composition which excluded the additives of this invention. The 60/40 mixture of CX221 and CT200 over the respective resins hardened independently in terms of mechanical strength and deflection temperature under load. Incorporation of an additive of this invention also served to improve the electrical properties.

TABLE 5

| | Composition (part by weight) | | | | | Characteristic values | |
|---|---|---|---|---|---|---|---|
| | Epoxy resin | Hardener | | Filler | Additive according to this invention | Intrinsic volume resistivity (Ω.cm) 25°C | Treeing characteristic voltage (KV) |
| No. | EPIKOTE 828 | MNA | DMP-30 | Silica powder | | | |
| 7 | 100 | 80 | 2 | 100 | No addition | 6 × 10$^{15}$ | 5.0 |
| 8 | 100 | 80 | 2 | 100 | Propyl pyrene (20) | 8 × 10$^{15}$ | 13.5 |
| 9 | 100 | 80 | 2 | 100 | Propyl fluoranthene (20) | 9 × 10$^{15}$ | 14.0 |

EXAMPLE 6:

100 parts by weight of Epikote 828 as an epoxy resin was mixed thoroughly with 20 parts be weight of propyl pyrene and with 20 parts by weight of propyl fluoranthene. Subsequently, the resultant mixtures were quickly mixed with 12 parts by weight of triethylene tetramine (TETA) as an amine type hardener, deaerated at normal room temperature for one hour under vacuum, then cast in a mold, allowed to stand therein for 24 hours, and thereafter hardened at 100°C for two hours. The compositions thus produced were observed

TABLE 4

| | Composition (part by weight) | | | | | Characteristic values | |
|---|---|---|---|---|---|---|---|
| | Epoxy resin | | Hardener | | Additive according to this invention | Intrinsic volume resistivity (Ω.cm) 25°C | Treeing characteristic voltage (KV) |
| No. | CX221 | CT200 | HH-PA | BDMA | | | |
| 4 | 60 | 40 | 100 | 1.0 | No addition | 8 × 10$^{16}$ | 5.5 |
| 5 | 60 | 40 | 100 | 1.0 | Propyl pyrene (20) | 6 × 10$^{16}$ | 12.0 |
| 6 | 60 | 40 | 100 | 1.0 | Propyl fluoranthene (20) | 5 × 10$^{16}$ | 11.5 | to be notably improved in terms of treeing characteristic voltage as compared with the composition not containing such an additive. The results are shown in Table 6.

TABLE 6

| No. | Composition | | | Characteristic values | |
|---|---|---|---|---|---|
| | Epoxy resin EPIKOTE 828 | Hardener TETA | Additive according to this invention | Intrinsic volume resistivity (Ω.cm) 25°C | Treeing characteristic volume (KV) |
| 10 | 100 | 12 | No addition | $6.7 \times 10^{15}$ | 6.0 |
| 11 | 100 | 12 | Propyl pyrene (20) | $1.0 \times 10^{16}$ | 10.0 |
| 12 | 100 | 12 | Propyl fluoranthene (20) | $1.3 \times 10^{16}$ | 10.5 |

What is claimed is:

1. An epoxy resin composition having stabilized electrical properties comprising 100 parts by weight of an epoxy resin and 5-50 parts by weight propylfluoranthene or propylpyrene.

2. The epoxy resin of claim 1 wherein said propylfluoranthene is the form of a mixture of isomers.

3. The epoxy resin of claim 1 wherein said propylpyrene is in the form of a mixture of isomers.

4. The epoxy resin composition of claim 1 wherein said epoxy resin is selected from glycidyl ethers, glycidyl esters, glycidyl amines, linear aliphatic epoxy resins and alicyclic epoxy resins.

5. A method for stabilizing the electricl properties of an epoxy resin by incorporating 5-50 parts by weight of propylfluoranthene or propylpyrene into 100 parts by weight of said epoxy resin.

* * * * *